United States Patent [19]
Smith et al.

[11] Patent Number: 6,009,124
[45] Date of Patent: Dec. 28, 1999

[54] HIGH DATA RATE COMMUNICATIONS NETWORK EMPLOYING AN ADAPTIVE SECTORED ANTENNA

[75] Inventors: James P. Smith; James T. Doyle, both of Chandler, Ariz.

[73] Assignee: Intel Corporation, Santa Clara, Calif.

[21] Appl. No.: 08/934,789

[22] Filed: Sep. 22, 1997

[51] Int. Cl.$^6$ .................................. H04B 7/02; H04L 1/02
[52] U.S. Cl. .......................... 375/267; 375/299; 375/347; 455/69; 455/562; 455/226.2
[58] Field of Search ...................................... 375/256, 259, 375/267, 299, 347; 342/368; 455/68, 69, 226.1, 226.2, 562, 67.7

[56] References Cited

U.S. PATENT DOCUMENTS

| | | | |
|---|---|---|---|
| 5,087,917 | 2/1992 | Fujisaka et al. | 342/84 |
| 5,117,502 | 5/1992 | Onoda et al. | 455/437 |
| 5,596,329 | 1/1997 | Searle et al. | 342/374 |
| 5,619,525 | 4/1997 | Wiedeman et al. | 375/200 |
| 5,640,684 | 6/1997 | Konosu et al. | 455/67.7 |
| 5,797,083 | 8/1998 | Anderson | 455/25 |

OTHER PUBLICATIONS

"Metawave Demos Smart Antenna For CDMA–Based Cellular And PCs;" *Wireless Systems Design*; Jan. 1997; p. 9.
"Wireless LAN Design—Emerging Standards Or Custom?;" Roberts, William;*Wireless Systems Design*, Jan. 1997, pp. 34–39.
"Developing A Low–Cost, Flexible RF Base Station For Indoor Use;" Kaczmarek, Lou;*Wireless Systems Design*, Jan. 1997, pp. 40–44.

*Primary Examiner*—Don N. Vo
*Attorney, Agent, or Firm*—Blakely, Sokoloff, Taylor & Zafman LLP

[57] ABSTRACT

A high data rate communication system that employs an adaptive sectored antenna is disclosed. The high data rate communication system includes an antenna subsystem for receiving and transmitting data. The antenna subsystem is adapted to be spatially steered. A radio frequency transceiver that is coupled to the antenna subsystem and that selectively generates a bit error rate (BER) signal and a receive signal strength indication (RSSI) signal based upon a received antenna training sequence is also provided. The system also includes a beam steering state machine that is coupled to the radio frequency transceiver and that selectively generates a BER_PASS signal and an RSSI_PASS signal based upon whether the BER signal is in a first logical relationship with a predetermined BER signal and the RSSI signal is in a second logical relationship with a predetermined RSSI signal. An antenna controller is coupled to the antenna subsystem and the beam steering state machine and selectively generates antenna control signals to spatially steer the antenna subsystem based upon the BER_PASS signal and the RSSI_PASS signal.

25 Claims, 8 Drawing Sheets

HIGH DATA RATE COMMUNICATIONS NETWORK EMPLOYING AN ADAPTIVE SECTORED ANTENNA

BACKGROUND OF THE INVENTION

1. Field of the Invention

The invention relates generally to high data rate communication systems and more specifically to a high data rate communication network employing an adaptive sectored antenna.

2. Description of the Related Art

Conventionally, sectored antennas are employed in military applications. For example, a base unit transmits a message for a mobile unit or units that are deployed on a battlefield. An enemy employs a jamming device to prevent a mobile unit from receiving the intended signal sent by the base unit. A mobile unit that employs an adaptive sectored antenna can discriminate between the jamming signal and hone in on the intended message sent by the base unit. In other words, the mobile unit can steer the adaptive sectored antenna so that the antenna spatially ignores the jamming signal and focuses or hones in on the intended signal.

With the proliferation of electronic devices that communicate with other devices at a high data rate, there is an increasing demand for wireless communications in the home or workplace. For example, a user of a portable laptop computer does not want to be tethered to a particular desk or work area and, instead, demands the flexibility of portable devices (e.g., a laptop, PDA, etc.). Moreover, there is a consumer demand for the reduction in the number of physical wires and connections that are needed between the electronic devices found in one's home. For example, it would be desirable for a consumer to have a single access point for multimedia data (e.g., a cable television connection) and a wireless connection between that connection of multimedia data and consumer appliances that play or record such data. It is cumbersome for each television or VCR to have a separate connection, and it would be desirable instead to have a wireless link between the multimedia data port and the appliances.

A significant hurdle in implementing a high data rate communications system in a home environment is the interference from adjacent cells and what is known as "delay spread". The delay spread is simply the time smearing of a signal. In a home environment, a cell can be a single home. However, since each home essentially employs the same frequency channels, there is a high degree of probability that the communications systems in adjacent homes (e.g., those in neighboring homes) interfere with each other. The interference is compounded when a cell is physically adjacent to another cell as in the case of an apartment complex where interference can stem from any one of the four walls and also from the ceiling or floor.

A possible approach to minimizing the delay spread that was conceived and considered by the inventors of the present invention, but deemed to be an inferior solution as compared with the teachings of the present invention, is the development of sophisticated equalizers to minimize the delay spread. A problem with this approach is that an equalizer must operate at a frequency which is greater than the data communication transmission rate.

The complexity of the hardware and manufacturing constraints of the standard silicon processing techniques are barriers to developing a cost-effective and efficient equalizer. Furthermore, although high speed equalizers are theoretically possible, there is a physical limit to the operation speed of an equalizer imposed by manufacturing considerations that render the development of an equalizer above a certain prespecified operating speed an impossibility.

Accordingly, there remains a need for a high data rate communication system that reduces the interference generated by that communication system and, further, can discriminate between interference generated by another high data rate communication system and the intended data and minimizes the effective delay spread.

SUMMARY OF THE INVENTION

A high data rate communication system that employs an adaptive sectored antenna is disclosed. The high data rate communication system includes an antenna subsystem for receiving and transmitting data. The antenna subsystem is adapted to be spatially steered. A radio frequency transceiver that is coupled to the antenna subsystem and that selectively generates a bit error rate (BER) signal and a receive signal strength indication (RSSI) signal based upon a received antenna training sequence is also provided. The system also includes a beam steering state machine that is coupled to the radio frequency transceiver and that selectively generates a BER_PASS signal and an RSSI_PASS signal based upon whether the BER signal is in a first logical relationship with a predetermined BER signal and the RSSI signal is in a second logical relationship with a predetermined RSSI signal. An antenna controller is coupled to the antenna subsystem and the beam steering state machine and selectively generates antenna control signals to spatially steer the antenna subsystem based upon the BER_PASS signal and the RSSI_PASS signal.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

A high data rate communication network, configured in accordance to the teachings of one embodiment of the present invention employs an adaptive sectored antenna operating at a first predetermined frequency. For example, the adaptive sectored antenna can operate at approximately 5 GHz for a home based high data rate communication network. In one embodiment of the present invention, the communication network operates at data rate of approximately 10 Mbps.

The high data rate communication network is susceptible to external interference. External interference can stem from adjacent cells or from a source within the cell. A beam steering state machine, configured according to the teachings of the present invention includes an interference reduction circuit to reduce such interferences.

As the adaptive sectored antenna includes a movable sector of coverage (i.e., it can be steered spatially), the interference reduction circuit can be employed to steer the antenna. The interference reduction circuit, which is coupled to the adaptive sectored antenna, selectively moves the sector of coverage to alternative configurations to reduce the external interference based on interference indication signals, described hereinafter.

Figure 1:
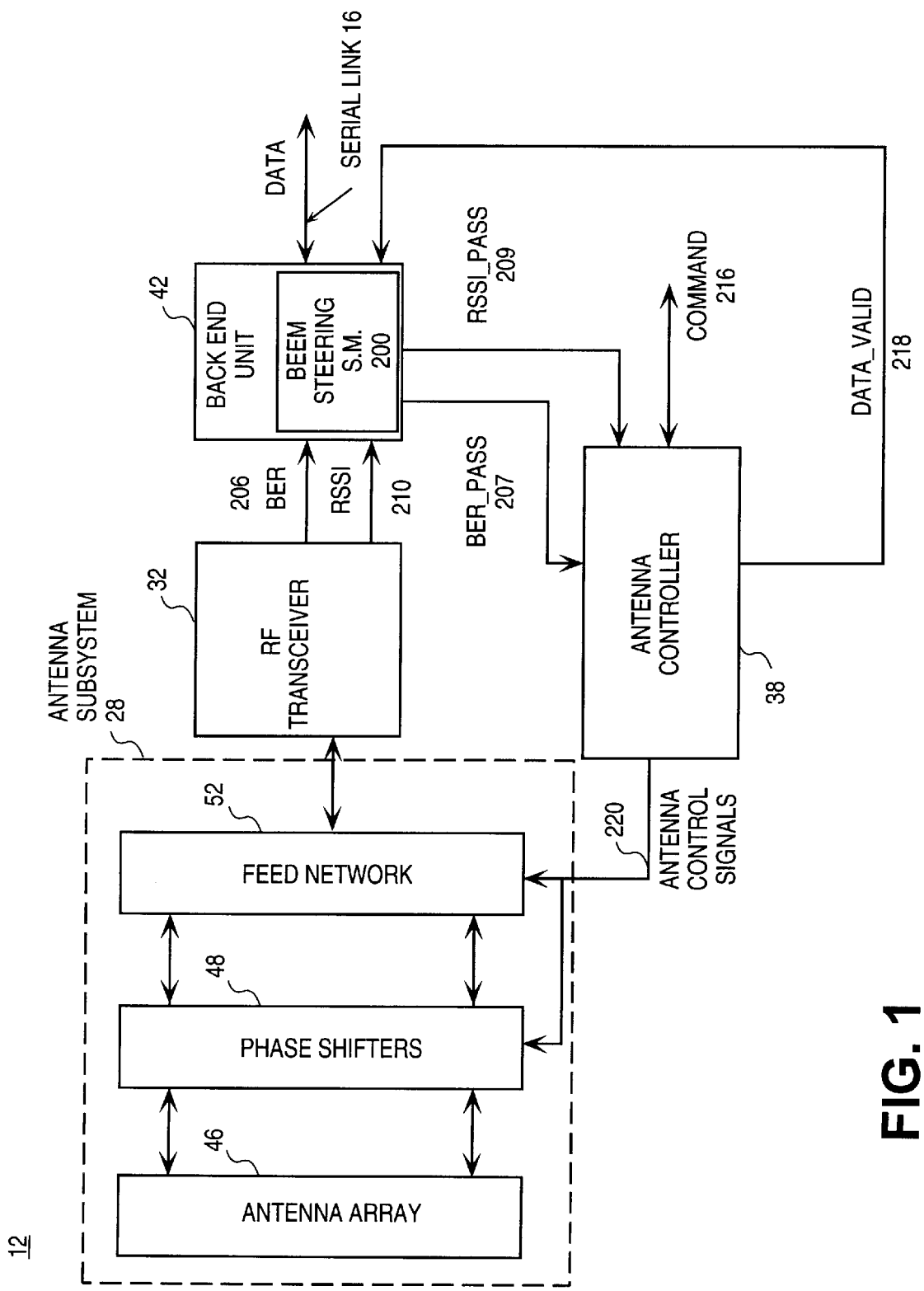
FIG. 1 illustrates a simplified block diagram of the radio subsystem employing the adaptive sectored antenna of the present invention.

FIG. 1 illustrates a simplified block diagram of a radio subsystem 12 employing the adaptive sectored antenna of the present invention. The radio subsystem 12 includes an antenna subsystem 28, an RF transceiver 32, an antenna controller 38 and a back end unit 42.

The antenna subsystem 28 includes an antenna array 46 followed by a phase shifters 48, followed by a feed network 52. The antenna controller 38 selectively controls the phase shifters 48 and the feed network 52 to insert delays of the received data so as to "steer" the antenna. The antenna controller 38 includes an input for receiving a BER_PASS signal, an RSSI_PASS signal and, based on these signals, selectively generates control signals to the phase shifters 48, the feed network 52, as well as a command 216 and a DATA_VALID signal 218. The command 216 is an optional signal that provides status and data to an external host PC or a local processor. It is important to note that the command 216 does not affect the operation of the adaptive sectored antenna of the present invention.

The RF transceiver 32 performs well known transmission and reception functions and also includes a demodulation unit to demodulate incoming data. The back end unit 42 provides data to the serial link 16. The RF transceiver 32 receives from and transmits data to the antenna subsystem 28. The RF transceiver 32 also provides the BER signal 206 and an RSSI signal 210 to back end unit 42. The BER signal 206 and the RSS1 signal 210 are generated from the received data by well known methods.

Figure 2:
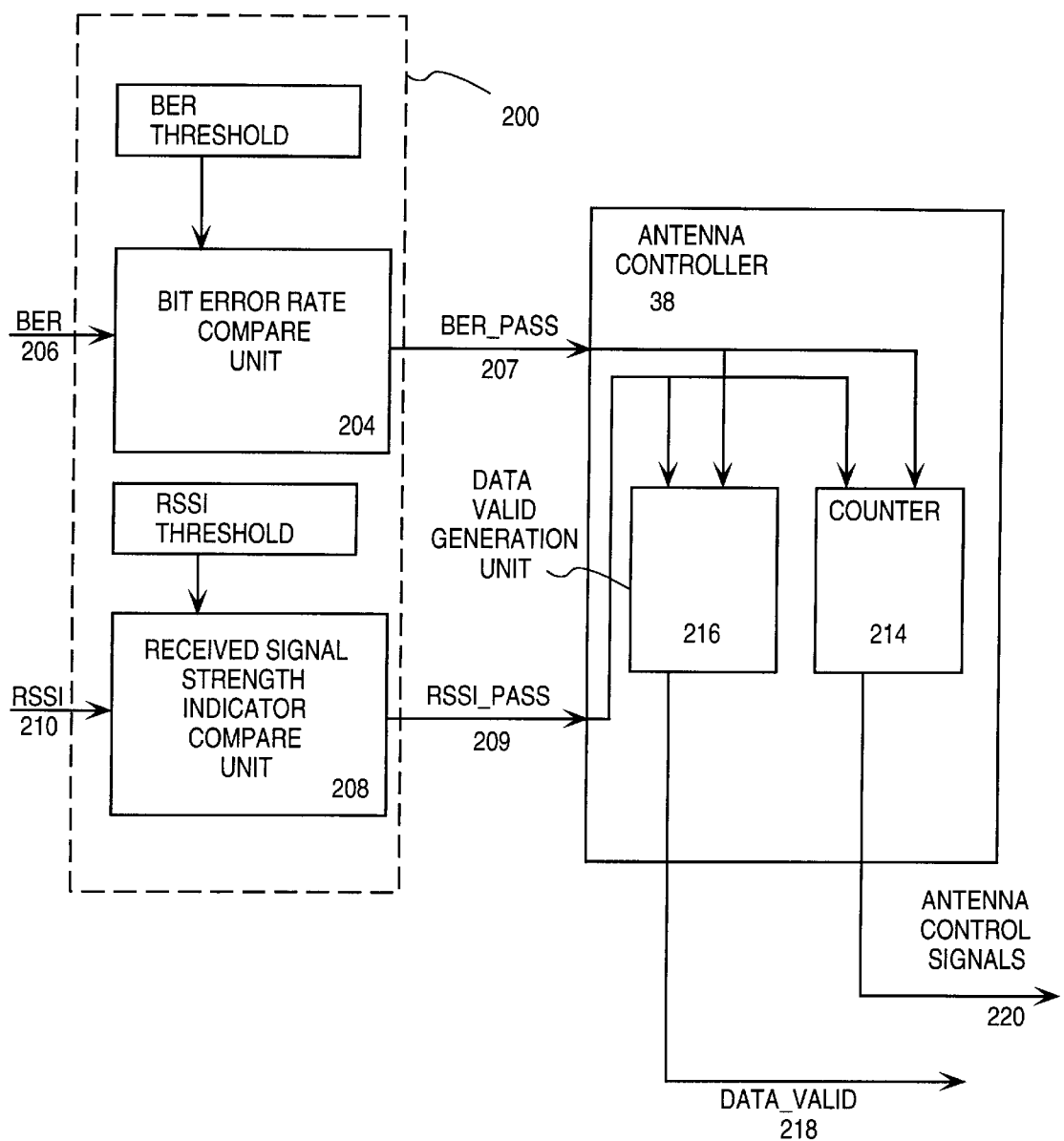
FIG. 2 illustrates a simplified block diagram of the beam steering state machine of FIG. 1.

The back end unit 42 includes the beam steering state machine 200, illustrated herein with reference to FIG. 2.

FIG. 2 illustrates the beam steering state machine 200 configured in accordance with the teachings of the present invention. The beam steering state machine 200 includes a bit error rate (BER) compare unit 204 that includes an input for receiving a bit error rate (BER) signal 206. The BER compare unit 204 compares the BER signal 206 with a predetermined bit error rate threshold. The bit error rate is simply the ratio of the number of bits in error received and the number of correct bits received. In the preferred embodiment, the predetermined bit error rate threshold is approximately $10^{-9}$. A predetermined bit error rate threshold of approximately $10^{-5}$ provides tolerable system performance, but a bit error rate of greater than $10^{-5}$ yields unacceptable system performance because at such a BER the data is unreliable. If the BER signal 206 is less than the predetermined BER threshold, the BER compare unit 204 generates a BER_PASS signal 207.

The beam steering state machine 200 also includes a received signal strength indicator (RSSI) compare unit 208 that includes an input for receiving an Received Signal Strength Indicator (RSSI) signal 210. The received signal strength indicator compare unit 208 compares the received RSSI signal 210 with a predetermined RSSI threshold. The received signal strength indicator is approximately equivalent to the ratio of the signal power to the noise power. In the preferred embodiment, the predetermined RSSI threshold is approximately 30 dB. When the predetermined RSSI threshold is approximately 20 dB, tolerable system performance can be achieved. However, a RSSI threshold of less than 20 dB yields unsatisfactory system results because the signal is weak and indistinguishable from noise.

The predetermined RSSI threshold value or signal is based on a calibration point that is programmed into the adaptive steering state machine 200 of the present invention. The predetermined RSSI threshold value ensures that the beam steering algorithm of the present invention ceases to steer the beam when a received RSSI signal passes the predetermined RSSI threshold. The predetermined RSSI threshold is a given signal to noise ratio that provides a low bit error rate.

The antenna controller 38 is coupled to the BER compare unit 204 and the RSSI compare unit 208 for receiving the BER_PASS signal 207 and the RSSI_PASS signal 209, respectively. In response to these signals, the antenna controller 38 selectively generates control signals 220 to the phase shifters 48 to control the antenna array 46 (i.e., to selectively steer the antenna in a first spatial direction or a second spatial direction). If both the BER_PASS signal 207 and RSSI_PASS signal 209 are asserted, then the antenna controller 38 stops the steering since the current spatial orientation of the antenna is optimal according to the beam steering algorithm of the present invention, which is described hereinbelow with reference to FIG. 3. The antenna controller 38 can employ an up-down counter 214 to steer the antenna based on BER_PASS signal 207 and RSSI_PASS signal 209. The antenna controller 38 includes a data valid generation circuit 216 for providing the DATA_VALID signal 218 based on the BER_PASS signal 207 and RSSI_PASS signal 209. The data valid generation circuit 216 can be implemented with an AND gate.

It will be understood by those of ordinary skill in the art that the antenna controller 38 can be integrated into the beam steering state machine 200.

Figure 3:
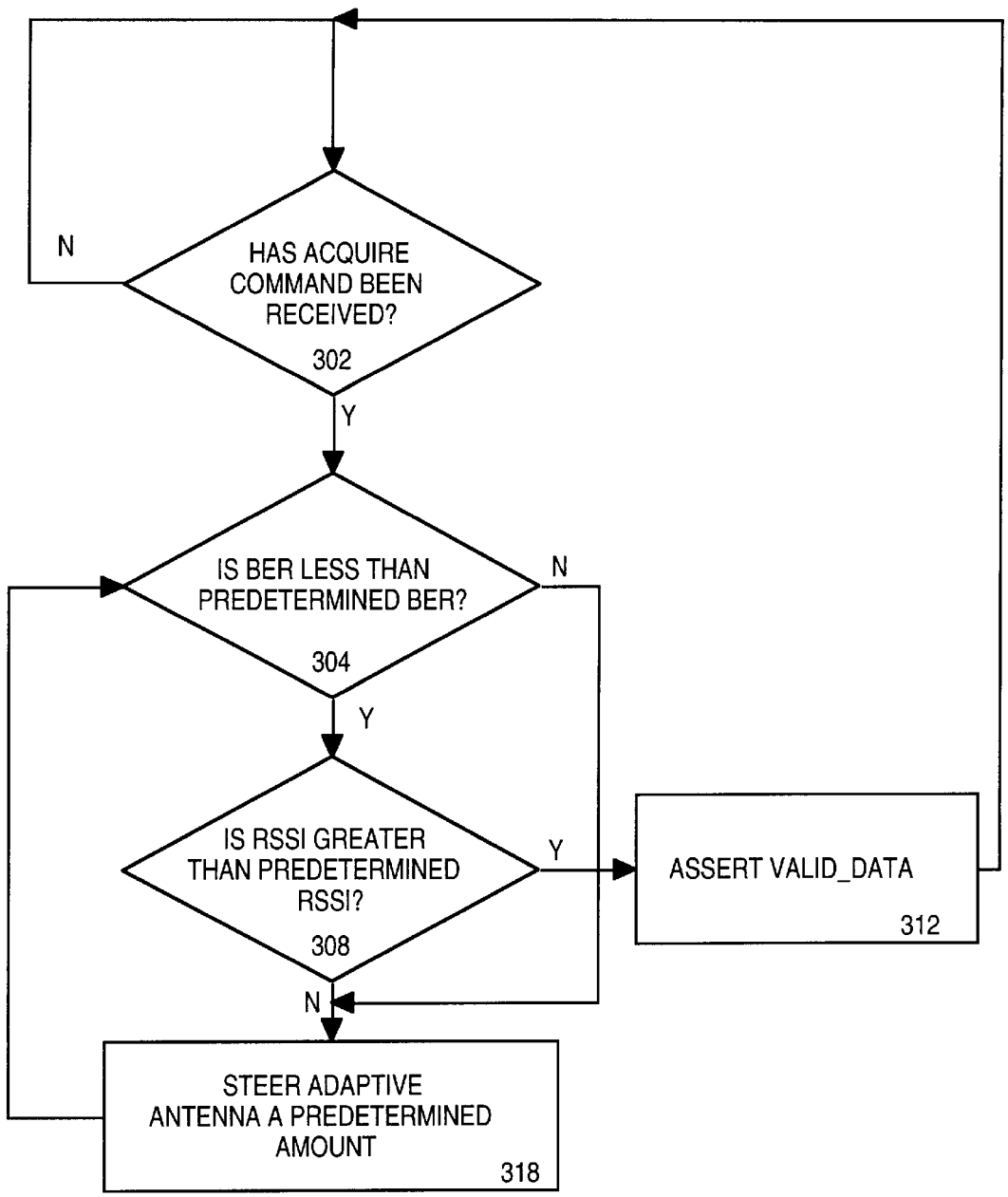
FIG. 3 illustrates a flowchart illustrating the processing steps performed by the beam steering state machine of FIG. 2.

FIG. 3 illustrates a flow chart of the steps carried out by the beam steering state machine 200. The adaptive antenna of the present invention implements a beam steering algorithm that is based on two interference indication signals: 1) the BER (bit error rate) and 2) the RSSI (Received Signal Strength Indicator).

In decision block 302, a determination is made whether a convergence or re-acquire command has been received. The convergence command instructs the beam steering state machine 200 to steer or re-steer the antenna to a source of data. As described hereinbelow, the data source (transmitter) sends a timing sequence which is data specifically designated by the system and employed by the beam steering state machine 200 to steer the antenna to the data source. In decision block 304, a further determination is made whether or not the received bit error rate passes a predetermined BER threshold. If yes, in decision block 308, a further determination is made whether or not the received RSSI passes a predetermined RSSI threshold. If yes, in step 312 a VALID_DATA signal is asserted. For example, the VALID_DATA signal can be employed to indicate to the system that data reception can begin. The antenna controller 38 can be integrated in the back end unit 42.

If the decision in either decision block 304 or decision block 308 is no, the processing proceeds to processing block 318. In processing block 318, the adaptive sectored antenna is selectively steered in a first spatial direction or a second spatial direction in a predetermined increment. In the preferred embodiment, the preferred increment is 22.5°. The counter 214 can be configured to increment the phase shifters 48 in an antenna subsystem 28, which in turn steers the antenna array 46 in predetermined increments in a first spatial direction or a second spatial direction. When to increment the counter, decrement the counter 214, or hold the current value in the counter is based on the RSSI threshold and BER threshold. These threshold values can be tailored to suit a particular application. The configuration of the counter 214 can depend on the following factors: (1) area of coverage; (2) beam width of antenna; (3) physical size of antenna; and (4) channel model and interference model employed.

Figure 4:
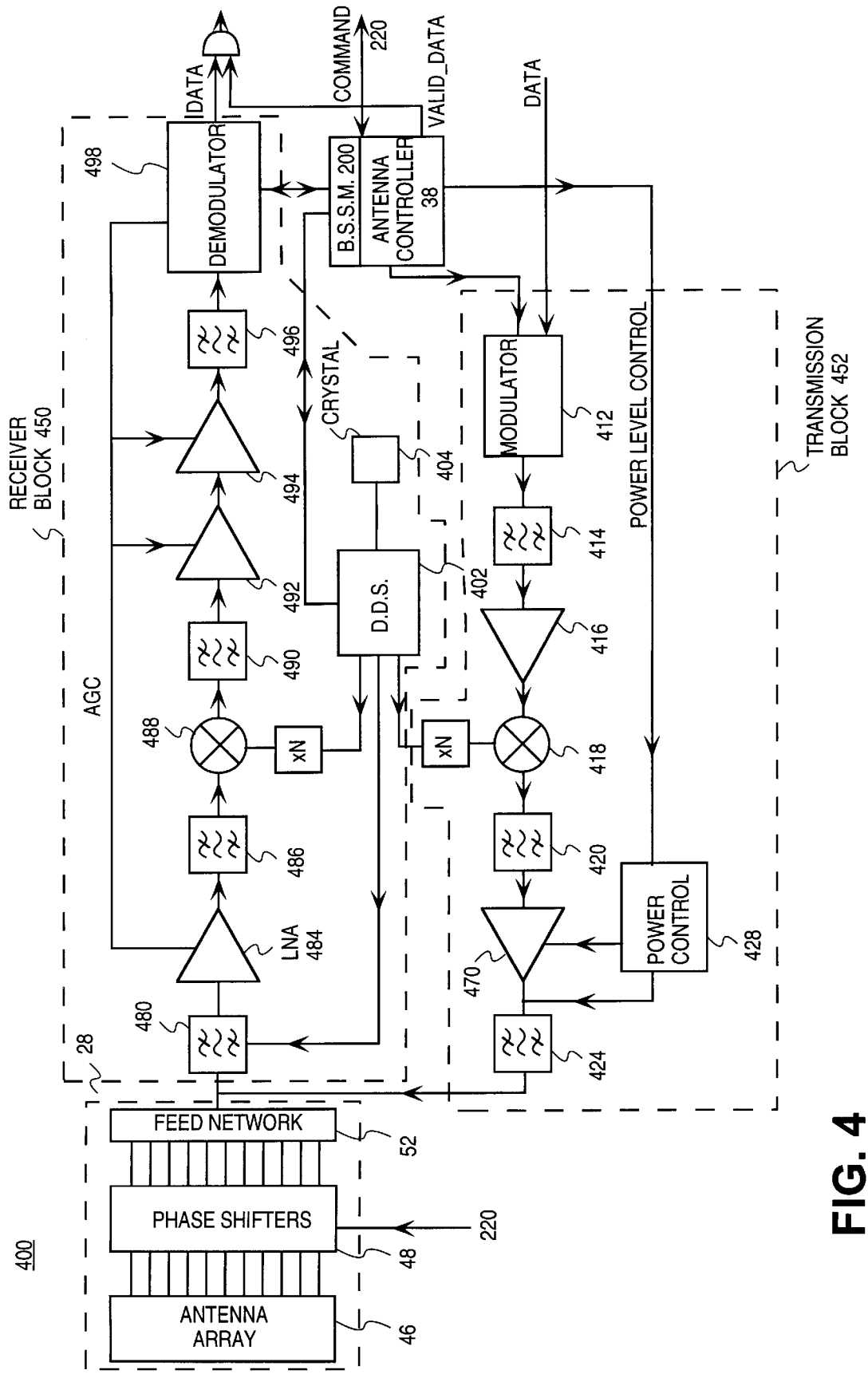
FIG. 4 is a simplified block diagram illustrating a transceiver employing the beam steering state machine, illustrated in FIG. 2.

FIG. 4 is a simplified block diagram illustrating a transceiver employing the beam steering state machine, illustrated in FIG. 2. The transceiver block 400 of the present invention includes an antenna subsystem 28 that further includes an array 46, phase shifters 48 and a feed network 52 described earlier with reference to FIG. 2. In this embodiment, the array 46, the phase shifters 48 and the feed network 52 are physically proximate to each other. The antenna subsystem 28 can be disposed on top of the personal computer or disposed in a strategically chosen location in one's home so that it can receive and transmit data from a number of devices around the home. The antenna subsystem 28 includes two inputs for receiving control signals 220 from the beam steering control block described hereinafter.

In this embodiment, a power amplifier 470 that is capable of operating at three different power levels is provided. A band pass filter 480 is provided in front of the low noise amplifier 484 to enable full duplex operation. The power amplifier 470 is a linear type of amplifier.

The phase shifters 48 can be digital phase shifters. These digital phase shifters 48 provide accurate phase shifts of 180°, 90°, 45° and 22.5°. Each of the digital phase shifters are switched on or off in sequence to scan the antenna array. For example, by providing a 1,1,1,1 input into the phase shifters 48, a phase shift of 180+90+45+22.5 (a total of 337.5°) occurs. In this embodiment, the phase shifters 48 allow for a phased shift change in intervals of 22.5°. Each phase shifter is connected to a radiating element, and each radiating element can have a different amount of phase shift. The combined "far field" energy has a maximum in a certain direction that is based on the difference in phase between the radiating elements. Consequently, by changing the phase difference between the radiating elements, the point of maximum radiated energy can be changed in direction.

The transceiver block 400 includes a receiver block 450 and a transmission block 452. The receiver block 450 includes a first band pass filter 480, a low noise amplifier 484, a second band pass filter 486, a mixer 488, a third band pass filter 490, a first and a second amplifier 492 and 494 for providing gain, and a fourth band pass filter 496. The receiver block 450 also includes a demodulator 498 for demodulating the received data. The receiver block 450 provides the demodulated data to a baseband unit (not shown) if the VALID_DATA signal is asserted.

The mixer 488 is coupled to a direct digital synthesizer (DDS) 402 that receives a master clock from a crystal oscillator 404 and responsive thereto generates a plurality of clocks having frequencies that are a multiple of the frequency of the master clock. The mixer 488 performs down conversion of the received signal.

The demodulator 498 provides an automatic gain control (AGC) signal to the low noise amplifier 484, and the gain amplifiers 492 and 494. The mixer components, amplifier components and band pass filter components, as well as the demodulator 498, are well known to those skilled in the art.

The transmission block 452 includes a modulator block 412, a first band pass filter 414, a gain amplifier 416, a mixer 418, a second band pass filter 420, a power amplifier 470 and a third band pass filter 424. The transmission block 452 further includes a power control circuit 428 having a first input for receiving a power level control signal, a second input for receiving a received RF signal, and an output for controlling the power level of power amplifier 470 based upon the power level control signal and the received RF signal. The power control circuit 428 is well known to those of ordinary skill in the art for reducing the transmission power levels when it is determined that a receiver is physically close or proximate to the transmitter.

The modulator block 412 includes an input for receiving data from the baseband unit (not shown) when the VALID_DATA signal is asserted. The modulator 412 also includes an input for receiving a control signal from the state machine 200 that is employed for beam steering.

The beam steering state machine 200, described previously in FIG. 2, can be implemented in transceiver 400. The beam steering state machine 200 can include a first input for receiving a clock from the direct digital synthesis block 402, and a second input for receiving the demodulated RF signal from the demodulator 498. The state machine 200 can also include a first output for generating and providing a control signal to the modulator block 412, a second output for generating and providing the power level control signal to the power control circuit 428, a third output for generating and providing the VALID_DATA signal to the base unit (not shown) and a fourth output for controlling the phase shifters 48 in the antenna subsystem 28.

In the preferred embodiment, there are six phase shifters in the phase shifters 48. Each phase shifter is controlled with a four-bit command. Accordingly, 24 control lines are provided to control the phase shifters 48 and steer the antenna beam. A four-bit control word allows the state machine 200 to steer the beam in increments of 22.5 degrees. Based on the control words sent to the six phase shifters, the antenna array 46 is spatially steered in a first direction or a second direction.

In an alternative embodiment, the state machine 200 is integrated with a baseband unit (not shown). A baseband unit can be a card adapted for baseband signal processing or a personal computer (PC). When the state machine 200 is integrated as part of the baseband unit, the 24 control lines can be in the form of a serial command that is provided to the phase shifters 48. Upon receipt of the serial command, additional circuitry can be employed to multiplex the serial command so as to direct each of the phase shifters.

Another challenge of the home environment is that a communication channel is not static. In a home environment, the BER and the RSSI can degrade due to 1) an object moving in front of the transmitter or 2) misalignment of the antenna (e.g., physical displacement). A simple example is when a person stands in a direct path between a transmitter and a receiver (e.g., a mobile unit). For example, the baseband unit can employ a protocol that periodically sends a convergence command to the state machine 200 of the present invention, instructing the state machine 200 to reacquire the signal.

The protocol can specify that, after the baseband unit has processed a predetermined number of packets of data, the baseband unit sends the state machine 200 an acquisition or convergence command. Accordingly, a continuous acquisition ensures that as the communication channel changes, the receiver adapts to these changes so that the bit error rate and the RSSI are maintained, and the signal quality does not degrade. In the example of a person moving in front of the transmitter, since the antenna can be steered to receive a reflected signal, after the antenna converges or reacquires a signal, the antenna can receive that reflected signal which is of a higher quality than a direct signal that is being blocked by the object.

Figure 5:
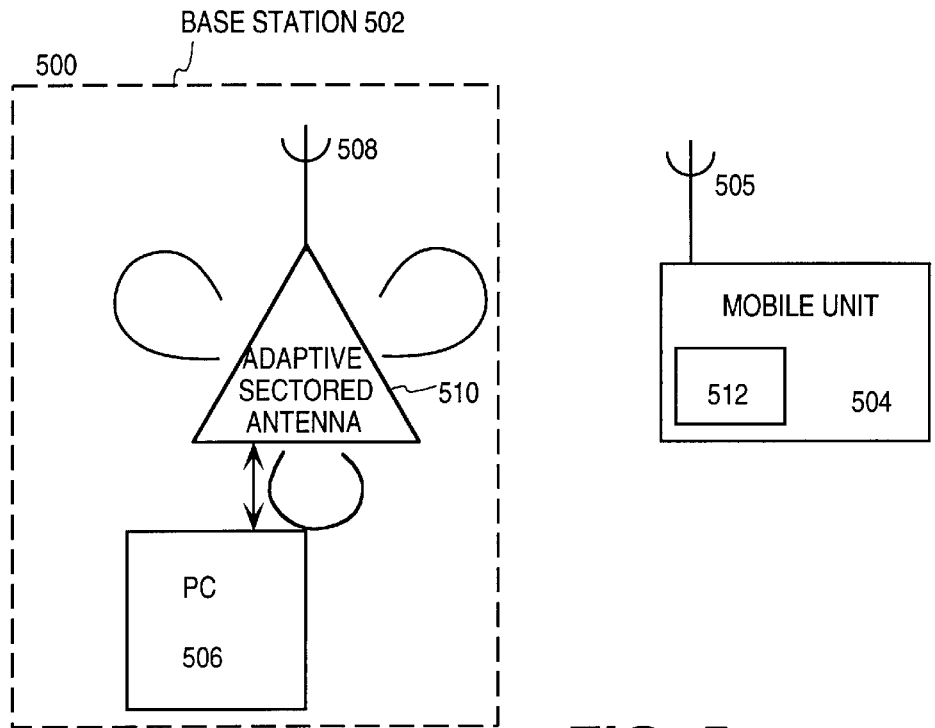
FIG. 5 illustrates a high data rate communication system configured in accordance with the teachings of one embodiment of the present invention.

FIG. 5 illustrates a high data rate communication system 500 configured in accordance with the teachings of one embodiment of the present invention. This communication system 500 includes a base station 502 and one or more mobile units 504. The base station 502 includes an omni-directional antenna 508 and an adaptive sectored antenna 510. The base station 502 also includes a personal computer 506. The beam steering state machine 200 of the present invention can be implemented in the adaptive sectored antenna 510 or the personal computer 506. In this embodiment, the adaptive sectored antenna 510 includes three planar antennas that are configured in a triangle formation, as shown.

Moreover, FIG. 5 illustrates a beam pattern that can be employed by the adaptive sectored antenna 510. Each of the planar antennas provides a beam that can be steered 180°, as the beam cannot be steered behind the planar antenna. Although the adaptive sectored antenna 510 is shown as a triangle configuration, it will be known by those skilled in the art that alternative arrangements are possible and depend on factors such as the layout of an environment in which the present invention is deployed. For example, an adaptive antenna employing two planer antennas that are back to back can provide adequate antenna coverage.

The mobile unit 504 includes an omni-directional antenna 505 for receiving and transmitting data from and to the base station 502. The mobile unit 504 includes electronics 512 that process the received data. For example, mobile unit 504 can be a portable personal computer (e.g., laptop) or a personal digital assistant (PDA). The protocol employed by the base station 502 and the mobile unit 504 is described in greater detail in FIG. 7.

Figure 6:
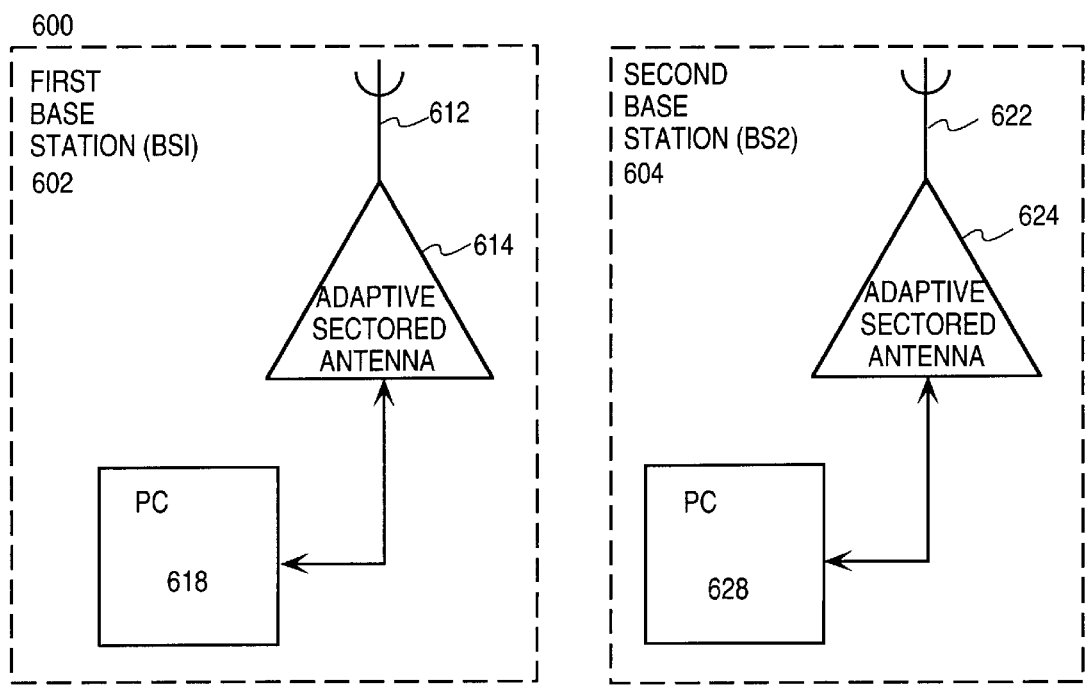
FIG. 6 illustrates a high data rate communication system configured in accordance with an alternative embodiment of the present invention.

FIG. 6 illustrates a high data rate communication system 600 configured according to the teachings of an alternative embodiment of the present invention. The high data rate communication system 600 includes a first base station 602 and a second base station 604. The first base station 602 includes an omni-directional antenna 612, an adaptive sectored antenna 614, configured in a triangle formation, and a personal computer 618 operatively coupled to the first base station 602.

The second base station 604 includes an omni-directional antenna 622, an adaptive sectored antenna 624, and a personal computer 628 operatively coupled to the second base station 604. The beam steering state machine 200 of the present invention can be implemented in the first base station 602 in either the adaptive sectored antenna 614 or the personal computer 618. The beam steering state machine 200 of the present invention can be implemented in the second base station 604 in either adaptive sectored antenna 624 or personal computer 628.

Figure 7:
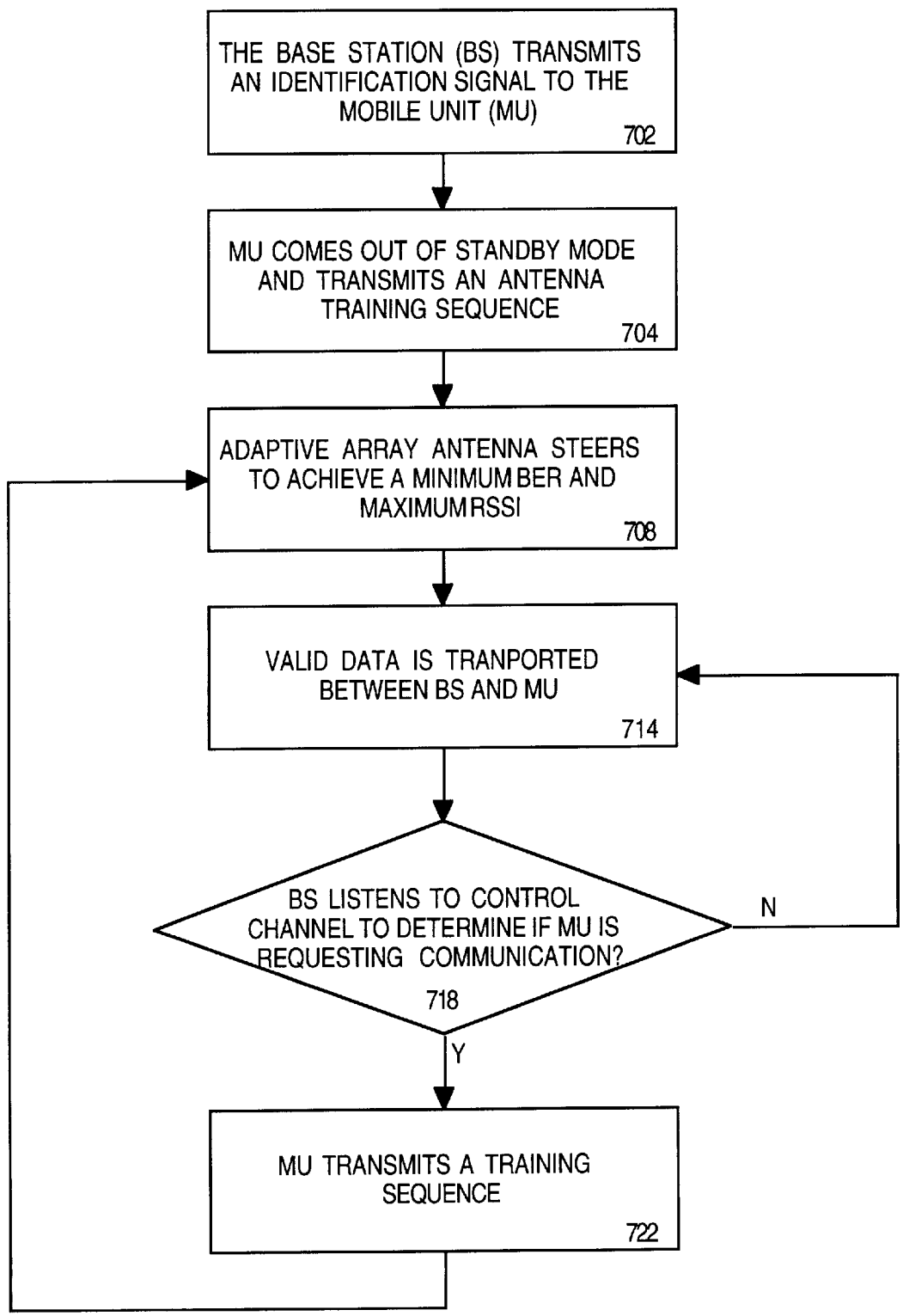
FIG. 7 is a flowchart illustrating a protocol employed by a base station and a mobile unit to communicate data there between in accordance with one embodiment of the present invention.

FIG. 7 is a flowchart illustrating a protocol employed by a base station an a mobile unit to initiate data transfer. An omni-directional antenna sends an acquisition command, instructing the receiving device to begin convergence or acquisition of training sequence. This protocol can be implemented in a MAC layer, where the MAC layer sends a convergence command to the PHY layer, instructing the adaptive antenna to go into the acquisition mode. In step 702, base station 502 transmits an identification signal to the mobile units 504. The identification signal uniquely identifies one of the mobile units, and the mobile unit to which the identification corresponds responds accordingly.

In step 704, the mobile unit 504 corresponding to the identification signal, wakes up and comes out of standby mode. In step 704, the mobile unit 504 transmits a training sequence via the omni-directional antenna 505 to the base station 502.

The base station 502 employs the omni-directional antenna 508 to transmit the identification signal to the mobile unit 504.

In step 708, the base station 502 employs the beam steering state machine 200 of the present invention to steer the adaptive sectored antenna 510.

Specifically, the beam steering state machine 200 steers the antenna to meet the predetermined BER and RSSI thresholds. In step 714, valid data is transferred between the omni-directional antenna 508 of the base station 502 and the adaptive sectored antenna 510 of the mobile unit 504.

In decision block 718, the base station 502 checks a control channel and determines whether a second mobile unit is requesting communication with the base station 502. If no, processing proceeds to step 714, and valid data continues to be transferred between the base station 502 and the first mobile unit 504.

If yes, in step 722, the second mobile unit employs its omni-directional antenna 505 to transmit an antenna training sequence to the base station 502. Processing then flows to processing step 708, where the base station 502 steers its adaptive sectored antenna 510 to meet the BER and RSSI thresholds with respect to the second mobile unit.

In this example, the mobile unit 504 is not equipped with an adaptive sectored antenna since a sectored antenna is typically bulky and not conducive to be incorporated into a mobile unit such as a laptop. Consequently, the mobile unit 504 employs the omni-directional antenna 505 to transfer data and communicate control signals (e.g., handshaking).

Figure 8:
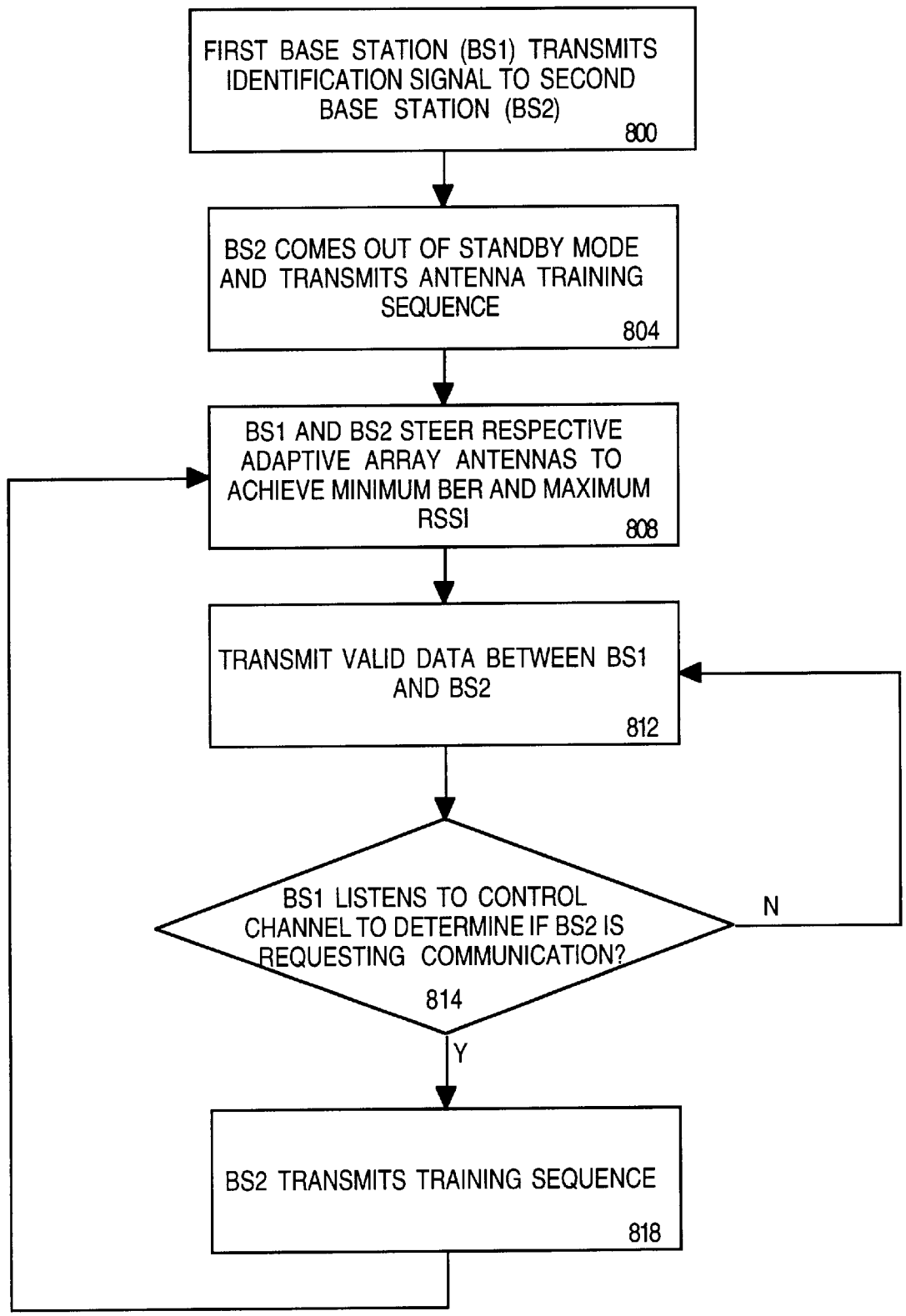
FIG. 8 is a flowchart illustrating a protocol employed by a first base station and a second base station to communicate data there between in accordance with a second embodiment of the present invention.

FIG. 8 is a flowchart illustrating the processing steps for a protocol between a first base station 602 and a second base station 604 shown in FIG. 6. In processing step 800, the first base station transmits an identification signal (ID signal) to a second fixed base station. In processing step 804, the second base station comes out of standby mode and transmits an antenna training sequence to the first base station. In processing step 808, the first base station and the second base station adaptively steer their respective arrays to achieve a minimum BER and a maximum RSSI.

In processing step 812, valid data is transmitted between the first base station and the second base station. In decision block 814, the first base station listens to a control channel for the second base station's request for communication and determines if such requests are active. If no, processing flows to processing step 812 (i.e., valid data is further transmitted between the first base station and the second base station). If yes, the second base station transmits a training sequence and in processing step 818, the processing flows to processing step 808.

In summary, the first base station 602 employs the omnidirectional antenna 612 to send a training sequence so that the adaptive sectored antenna 624 of the second base station can be steered to meet the BER and RSSI thresholds with respect to the first base station 602. Also, the second base station 604 transmits a training sequence via its omnidirectional antenna 622 so that the first base station 602 can steer its adaptive sectored antenna 614 to meet the BER and RSSI thresholds with respect to the second base station 604. Once the first base station 602 has steered its antenna to receive data from the first base station 602 and the second base station 604 has steered its adaptive sectored antenna to receive information from the first base station 602, data transfer can occur.

Figure 9:
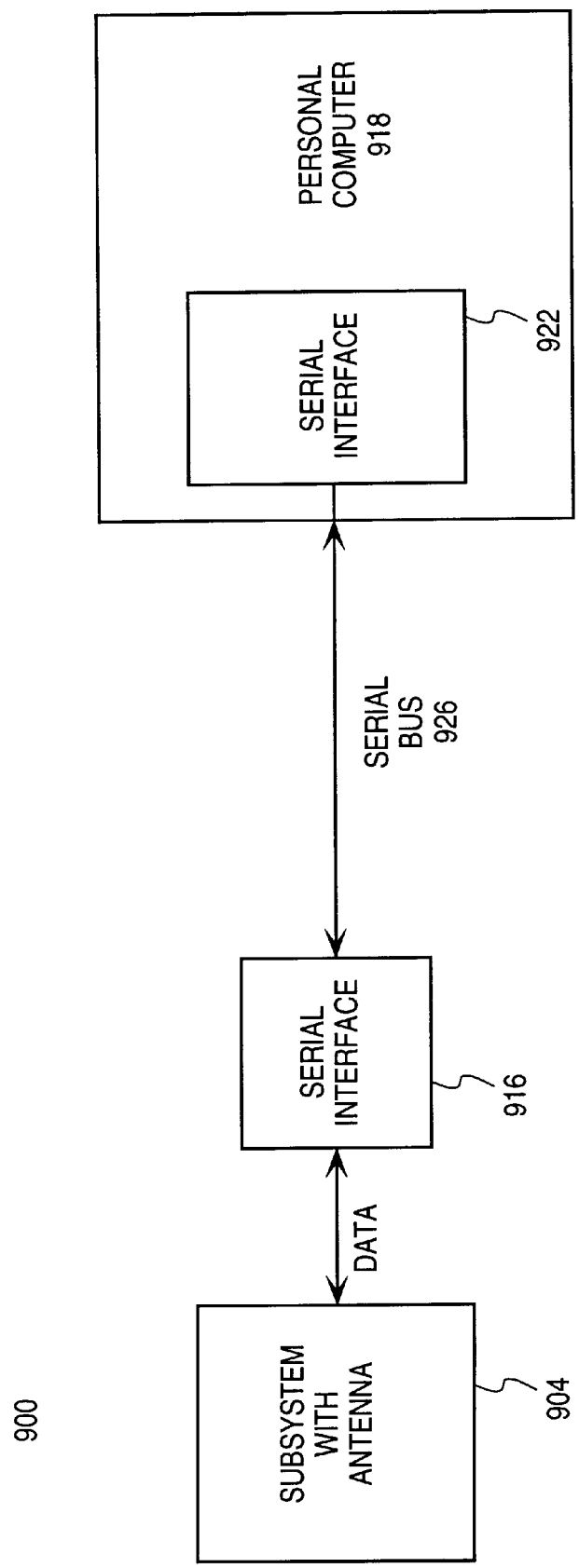
FIG. 9 illustrates a computer system in which the adaptive sectored antenna of the present invention can be implemented.

FIG. 9 illustrates a computer system in which the adaptive sectored antenna of the present invention can be implemented. The computer system 900 can include a radio subsystem 904 with antenna for receiving and transmitting radio signals, a serial interface 916 coupled to the radio subsystem with antennae for interfacing data received from the radio subsystem 904 into a serial format, and a desktop personal computer (PC 918) having a serial interface 922. The serial interface 916 and the serial interface 922 are coupled via a serial bus 926, such as a 1394 cable. The serial interfaces 916 and 922 can be adapted to the 1394 protocol and include both a 1394 link and a PHY layer.

According to another aspect of the present invention, the high data rate communication system, configured according to the teachings of the present invention, dynamically allocates the 1) frequency, 2) time and 3) data rate of the communication based on the demand of the mobile units. Unlike a cellular phone system in which the frequency and bandwidth and time slots are fixed regardless of the load or demand on the system, the high data rate communication system of the present invention dynamically allocates the bandwidth, time slots and data rates according to the demand.

Unlike an ATM system, the present invention does not waste bits or employ "padded" bits since the allocation is dynamically based on demand. In an ATM system, the purported high data rate is deceptive in that when an application does not require a high data rate, bandwidth is wasted. In fact, when fewer data bits than the maximum allowed are sent, the remaining data slots are padded with "don't care" bits that convey no useful information.

Furthermore, information can be encoded into the control signal so that a base unit is informed of the type of information and data rate demanded by that particular mobile unit. For example, if a video link is requested, the base unit dynamically assigns a longer time slot and bandwidth for that mobile unit, whereas a mobile unit that requests a low bandwidth low data rate application is allocated a correspondingly smaller frequency and bandwidth by the base station.

The high data rate communication system of the present invention can employ a time slot allocation scheme where the base station queries the mobile units in its area and determines the number of mobile units requesting service. Thereafter, each mobile unit is allotted a specific time slot in which to receive and transmit data and control signals. The base station then successively steers its antenna to focus on the particular mobile unit. For example, during a first time slot, the base station steers its antenna and directs it to the training signal sent by the first mobile unit. Thereafter, the base station trains its antenna to a training signal sent by the second mobile unit.

The base unit can also have intelligence to detect that a particular mobile unit does not require service in which case the antenna is steered to the next consecutive mobile unit.

In the preferred embodiment, this protocol is implemented in software executed on a personal computer. Alternatively, the software can be implemented in a gate array or a programmable logic circuit.

The beam steering algorithm of the present invention compares the detected bit error rate to a predetermined BER and also the detected RSSI predetermined RSSI. If the detected BER and RSSI simultaneously meet the predetermined threshold values, the antenna has acquired the signal.

Unlike prior art approaches that have employed beam steering (also commonly known in the art as null steering) in military applications where there was a single user in the environment, the present invention is adapted to operate in an environment having a high number of users. For example, the present high data rate communication system is adapted to operate in an environment having multiple users (e.g., a hyperLAN or ATM environment).

The beam steering circuit of the present invention enables the antenna to achieve spatial selectivity, to focus, and to converge on one of the users and reject signals from all other users in the environment.

The beam steering circuit receives the signal and compresses that signal with a threshold number that indicates a good signal to noise ratio. The beam steering circuit then converges on the antenna coverage generating the optimal signal to noise ratio.

A high data rate communication network that is susceptible to external interference and that employs an adaptive sectored antenna has been disclosed. The adaptive sectored antenna includes a movable sector of coverage. The beam steering machine and antenna controller are coupled to the adaptive sectored antenna for moving the sector of coverage to reduce external interference.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

We claim:

1. A high data rate communication system comprising:
    a) an antenna subsystem adapted to be spatially steered;
    b) a radio frequency transceiver, coupled to the antenna subsystem, for receiving an antenna training sequence and generating a bit error rate (BER) signal and a receive signal strength indication (RSSI) signal based on the antenna training sequence;

c) a beam steering state machine, coupled to the radio frequency transceiver, for receiving the BER signal and the RSSI signal, wherein the beam steering state machine includes:

a first comparator for receiving the BER signal and a predetermined BER signal, comparing the BER signal to the predetermined BER signal, and selectively generating the BER PASS signal when the BER signal is in the first predetermined logical relationship with the predetermined BER signal; and ii) a second comparator for receiving the RSSI signal and a predetermined RSSI signal, for comparing the RSSI signal to the predetermined RSSI signal, and for selectively generating the RSSI PASS signal when the RSSI signal is in a second predetermined logical relationship with the predetermined RSSI signal; and d) an antenna controller, coupled to the antenna subsystem and the beam steering state machine, for receiving the BER_PASS signal and the RSSI_PASS signal and responsive thereto, selectively generating antenna control signals for spatially steering the antenna subsystem.

2. The high data rate system of claim 1 wherein the beam steering state machine selectively generates a BER_PASS signal and an RSSI_PASS signal based upon whether the BER signal is in a first logical relationship with a predetermined BER signal and the RSSI signal is in a second logical relationship with a predetermined RSSI signal.

3. The high data rate system of claim 1 wherein the antenna controller includes a counter having a first input for receiving the BER_PASS signal, a second input for receiving the RSSI_PASS signal, and responsive thereto generates said antenna control.

4. The high data rate system of claim 1 wherein the antenna subsystem includes:

a) an antenna array;

b) a phase shifter, coupled to the antenna array; and c) a feed network coupled to the phase shifter and the radio frequency transceiver;

wherein the antenna controller provides the antenna control signals to the phase shifter and feed network for spatially steering the antenna array.

5. The high data rate system of claim 1 wherein the beam steering state machine determines whether the BER signal is less than a predetermined BER signal, if so, determining whether the RSSI signal is greater than a predetermined RSSI signal; if so, asserting a VALID_DATA signal, said VALID_DATA indicating that data can be received or transmitted; if the BER signal is greater than the predetermined BER signal or the RSSI is less than the predetermined RSSI signal, the beam steering state machine spatially steers the antenna array a predetermined amount; and continues to check the BER signal and the RSSI signal and to steer the antenna array until a predetermined BER and a predetermined RSSI is obtained.

6. The high data rate system of claim 1 wherein the first predetermined logical relationship is when the BER signal is less than or equal to the predetermined BER signal.

7. The high data rate system of claim 1 wherein the second predetermined logical relationship is when the RSSI signal is greater than the predetermined RSSI signal.

8. The high data rate system of claim 1 wherein the predetermined BER signal is approximately $10^{-5}$.

9. The high data rate system of claim 1 wherein the predetermined RSSI signal is approximately 20 dB.

10. A method of steering an adaptive antenna comprising the steps of:

a) receiving an antenna training sequence;

b) based on said antenna training sequence, determining a bit error rate (BER) signal based on said received antenna training sequence;

c) determining a receive signal strength indication signal (RSSI) based on said received antenna training sequence;

d) determining if the BER signal is in a first logical relationship with a predetermined BER signal;

if yes, further determining whether the RSSI signal is in a second logical relationship with a predetermined RSSI signal;

if yes, asserting a VALID_DATA signal said VALID_DATA signal indicating that data transfer can be initiated;

else spatially steering an antenna array in a predetermined amount and proceeding to determination step c);

else proceeding to processing step c).

11. The method of claim 10 further comprising before step a) the steps of:

a) determining if an acquire command has been received;

b) if yes, proceeding to processing step c) of claim 10;

c) if no, proceeding to processing step a).

12. The method of claim 10 wherein the first logical relationship is when the BER signal is less than a predetermined BER signal.

13. The method of claim 10 wherein the second logical relationship is when the RSSI signal is greater than a predetermined RSSI signal.

14. The method of claim 10 wherein the predetermined BER signal is approximately $10^{-5}$.

15. The method of claim 10 wherein the wherein the predetermined RSSI signal is approximately 20 dB.

16. A method of communicating data between a base station having an adaptive array antenna and a mobile unit comprising the steps of:

a) the base station transmitting an identification signal to the mobile unit;

b) the mobile unit transmitting an antenna training sequence to the base station;

c) the base station steering its adaptive array antenna to achieve a predetermined BER and a predetermined RSSI, wherein the step of steering includes the steps of:

i) determining a BER signal and an RSSI signal based on the antenna training sequence;

ii) comparing the BER signal to the predetermined BER signal;

iii) comparing the RSSI signal to the predetermined RSSI signal; and, iv) selectively controlling the adaptive array antenna based on whether the BER signal is in a first logical relationship with the predetermined BER signal and whether the RSSI signal is in a second logical relationship with the predetermined RSSI signal;

d) transporting valid data between the base station and the mobile unit;

e) determining whether the mobile unit is requesting communication;

if yes, the mobile unit transmitting a training sequence to the base station and proceeding to processing step c);

else proceeding at processing step e).

17. The method of claim 16 wherein the first logical relationship is when the BER signal is less than the predetermined BER signal.

18. The method of claim 16 wherein the second logical relationship is when the RSSI signal is greater than the predetermined RSSI signal.

19. The method of claim 16 wherein the predetermined BER signal is approximately $10^{-5}$.

20. The method of claim 16 wherein the wherein the predetermined RSSI signal is approximately 20 dB.

21. A method for communicating data between a first base station and a second base station, said first and second base station each employing an adaptive antenna array, said method comprising the steps of:
   a) a first base station transmitting an identification signal to a second base station;
   b) a second base station transmitting an antenna training sequence to the first base station;
   c) the first base station and the second base station each steering its adaptive array antenna to achieve a predetermined bit error rate (BER) and a predetermined RSSI, wherein the step of steering includes the steps of:
      i) determining a BER signal and an RSSI signal based on the antenna training sequence;
      ii) comparing the BER signal to the predetermined BER signal;
      iii) comparing the RSSI signal to the predetermined RSSI signal; and,
      iv) selectively controlling the adaptive array antenna based on whether the BER signal is in a first logical relationship with the predetermined BER signal and whether the RSSI signal is in a second logical relationship with the predetermined RSSI signal;
   d) transmitting valid data between the first base station and second data and second base station;
   e) the first base station determining if the second base station is requesting communication;
      if yes, the second base station transmitting the training sequence to the first base station,
      else, proceeding to processing step d).

22. The method of claim 21 wherein the first logical relationship is when the BER signal is less than the predetermined BER signal.

23. The method of claim 21 wherein the second logical relationship is when the RSSI signal is greater than the predetermined RSSI signal.

24. The method of claim 21 wherein the predetermined BER signal is approximately $10^{-5}$.

25. The method of claim 21 wherein the wherein the predetermined RSSI signal is approximately 20 dB.

* * * * *